United States Patent [19]
Mozgowiec et al.

[11] Patent Number: 5,233,873
[45] Date of Patent: Aug. 10, 1993

[54] ACCELEROMETER

[75] Inventors: Mark D. Mozgowiec, Boston; Kai L. Keasey, Somerville; Steven Beringhause, N. Attleboro, all of Mass.

[73] Assignee: Texas Instruments Incorporated, Dallas, Tex.

[21] Appl. No.: 725,844

[22] Filed: Jul. 3, 1991

[51] Int. Cl.[5] .............................................. G01P 1/02
[52] U.S. Cl. ...................................... 73/497; 73/493; 73/517 R
[58] Field of Search ............... 73/517 R, 497, 862.67, 73/493, 516 R; 338/2, 5, 46

[56] References Cited

U.S. PATENT DOCUMENTS

| | | | |
|---|---|---|---|
| 4,164,263 | 8/1979 | Heintz et al. | 73/517 R |
| 4,825,696 | 5/1989 | Seipler | 73/493 |
| 4,829,822 | 5/1989 | Imai et al. | 73/517 R |
| 4,926,689 | 5/1990 | Hanson | 73/497 |
| 5,058,430 | 10/1991 | Aske | 73/497 |
| 5,150,616 | 9/1992 | Kondo et al. | 73/517 R |

FOREIGN PATENT DOCUMENTS

| | | |
|---|---|---|
| 0247247 | 12/1987 | European Pat. Off. |
| 0383974 | 8/1990 | European Pat. Off. |
| 0401669 | 12/1990 | European Pat. Off. |
| 1-302169 | 12/1989 | Japan ................................ 73/517 R |

Primary Examiner—John E. Chapman
Attorney, Agent, or Firm—Russell E. Baumann; Richard L. Donaldson; Rene E. Grossman

[57] ABSTRACT

An accelerometer device particularly adapted for use in automotive safety air bag applications comprises an electrically insulating substrate having electrically conducting circuit paths, signal conditioning circuit components, and an accelerometer unit mounted thereon, the substrate being fixed in position on three pins within a housing. The accelerometer comprises a silicon mass movable in a silicon body relative to an integral silicon support to provide strain in the silicon body in response to acceleration and has piezoresistive sensors formed in the silicon body to be responsive to that strain to provide an electrical signal corresponding to the acceleration. A member having a selected configuration and thermal response characteristics suspends the accelerometer unit on the substrate with the piezoresistive sensors connected to the circuit paths with the piezoresistive sensors isolated from strain in the silicon body due to differences in thermal expansion between the silicon body, and the substrate during temperature changes likely to be encountered.

7 Claims, 3 Drawing Sheets

ACCELEROMETER

BACKGROUND OF THE INVENTION

The field of the invention is that of accelerometers, and the invention relates more particularly to silicon accelerometers for use in automotive safety air bag applications.

Conventional silicon accelerometers comprise a silicon mass which is movable in a silicon body relative to an integral silicon support to provide strain in the silicon body in response to acceleration of the body. Piezoresistive sensor means are formed in the silicon body material to be responsive to the strain to provide an electrical signal corresponding to the acceleration. The silicon body is mounted on an object whose acceleration is to be monitored, and the piezoresistive sensors are connected in a signal conditioning circuit to provide a control signal corresponding to acceleration of the object. It has been proposed that such accelerometers are particularly adapted for sensing automotive vehicle acceleration for regulating operation of safety air bag systems.

Frequently, when such accelerometers are proposed for use in automotive environments, it is found that the silicon body materials, the materials used in mounting the accelerometer in a vehicle and the materials used in electrically connecting piezoresistive sensors on the silicon body into a vehicle circuit display substantially different coefficients of thermal expansion. Some portions of the accelerometer also have to be fixed to a vehicle mount with secure clamping forces. Accordingly when such materials are subjected to widely varying temperature conditions likely to be encountered during automotive vehicle use, which temperatures typically vary over a range from $-40°$ C. to $85°$ C., the silicon body of the accelerometer tends to be subjected to strain due to the noted differences in thermal expansion properties so that the accuracy of output signal provided by the accelerometer is deleteriously affected by the strain.

BRIEF SUMMARY OF THE INVENTION

It is an object of the invention to provide a novel and improved accelerometer device; to provide such a device which is particularly adapted for use in automotive vehicles; to provide such a device having a silicon accelerometer body having piezoresistive sensors formed therein; to provide such a device wherein the silicon accelerometer body is substantially isolated from strain due to differences in thermal expansion between the silicon body, the means mounting the body, and the means connecting the sensors in an electrical circuit; and to provide such an accelerometer device which is of simple, rugged and reliable construction.

Briefly described, the novel and improved accelerometer device of the invention comprises a circuit board or substrate of electrically insulating material having electrically conductive circuit paths thereon. Preferably the circuit paths are provided on a planar upper surface of the substrate and the substrate has an opening therein disposed in spaced relation to the circuit paths. Preferably the substrate also has three triangularly-spaced mounting apertures.

The device also comprises an accelerometer unit having a silicon mass movable in a silicon body relative to an integral silicon support to provide strain in the silicon body in response to acceleration and having piezoresistive sensor means in the body to be responsive to the strain to provide an electrical signal corresponding to the extent of the acceleration. Electrical circuit components such as a control circuit embodied in an integrated circuit chip and/or various resistors and/or capacitors are provided on the substrate and connected to the circuit paths to form a signal conditioning circuit. A member is also provided for mounting the accelerometer unit on the substrate and means are provided to connect the piezoresistive sensor means to the circuit paths on the substrate while isolating or shielding the piezoresistive sensor means from strain in the silicon body which might be due to clamping forces during device mounting or to differences in thermal expansion of the silicon body, the substrate, and the conductive circuit paths during temperature changes likely to be encountered.

Preferably the mounting member is formed of a metal material such as a nickel-iron alloy having a coefficient of thermal expansion substantially corresponding to that of silicon and has opposite ends of the member secured to the substrate at respective opposite sides of the substrate opening, preferably on the planar substrate surface on which the circuit paths are disposed. A central platform portion of the member is connected to the opposite member ends by respective folded-leaf spring or flexure-reducing member portions so that the platform portion of the member is received within the substrate opening, preferably with a platform surface disposed parallel to and adjacent but somewhat below the level of the planar substrate surface to position accelerometer and substrate circuit paths and terminals in the same plane. The accelerometer unit as above described is mounted on that platform surface with an adhesive or the like to be suspended in or immediately over the substrate opening to be compactly accommodated in the device. Preferably the accelerometer device includes a housing of cup shape or the like having three integral pins upstanding from the cup bottom inside the housing, each pin having a larger diameter portion adjacent the cup bottom forming a shoulder spaced over the cup bottom. The mounting apertures of the substrate are fitted over those pins to rest and position the substrate on the noted shoulders and the heads or distal ends of the pins are flattened by ultrasonic staking or the like for securing the substrate on the pin shoulders. Preferably the member mounting the accelerometer has two corresponding mounting apertures in its respective opposite ends and the member mounting apertures are also fitted over two of the housing pins to be secured to the substrate by the flattened heads of the pins. Preferably a cover is fitted over the open end of the cup-shaped housing and sealed to the housing. In a preferred embodiment, the device housing has mounting lugs and bumper means thereon to permit mounting the device on an automotive vehicle or the like while isolating the accelerometer unit from strain due to device mounting. In that device, the accelerometer unit is adapted to provide an electrical signal more precisely corresponding to the acceleration forces to which the device is subjected, particularly when the device is subjected to the widely varying temperature conditions likely to be encountered in an automotive environment.

DESCRIPTION OF THE DRAWINGS

Other objects, advantages and details of the novel and improved accelerometer device of the invention appear in the following detailed description of preferred embodiments of the invention, the detailed description referring to the drawings in which.

DESCRIPTION OF THE PREFERRED EMBODIMENTS

Figure 1:
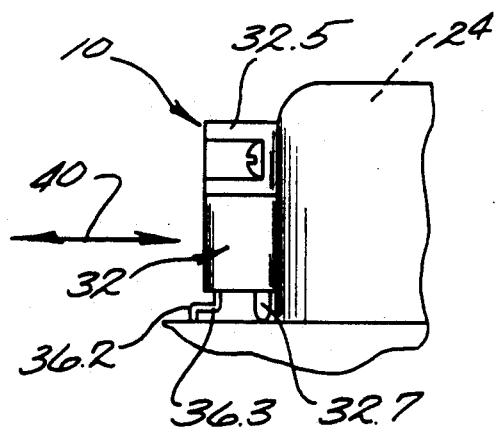
FIG. 1 is a side elevation view of the accelerometer device of the invention.

Referring to the drawings, 10 in FIGS. 1-4 indicates the novel and improved accelerometer device of the invention which is shown to include a circuit board or substrate 12 of an electrically insulating material such as ceramic, or fiberglass-filled polyethylene or the like. The substrate is provided with electrically conductive circuit paths of copper foil or the like in any conventional manner as is diagrammatically indicated at 14 in FIGS. 3 and 4. In the preferred embodiment of the invention, the circuit paths are provided on a planar upper surface 12.1 of the substrate and the substrate has an opening 16 formed in the substrate spaced from the circuit paths and preferably has three mounting apertures 18 arranged and spaced from each other in a triangular pattern as shown. Terminal pads 14.1 of the circuit paths are preferably formed along one edge of the substrate as shown and the thickness of the substrate is selected so that it is adapted to be rigid under the acceleration forces likely to be encountered by the device.

Figure 6:
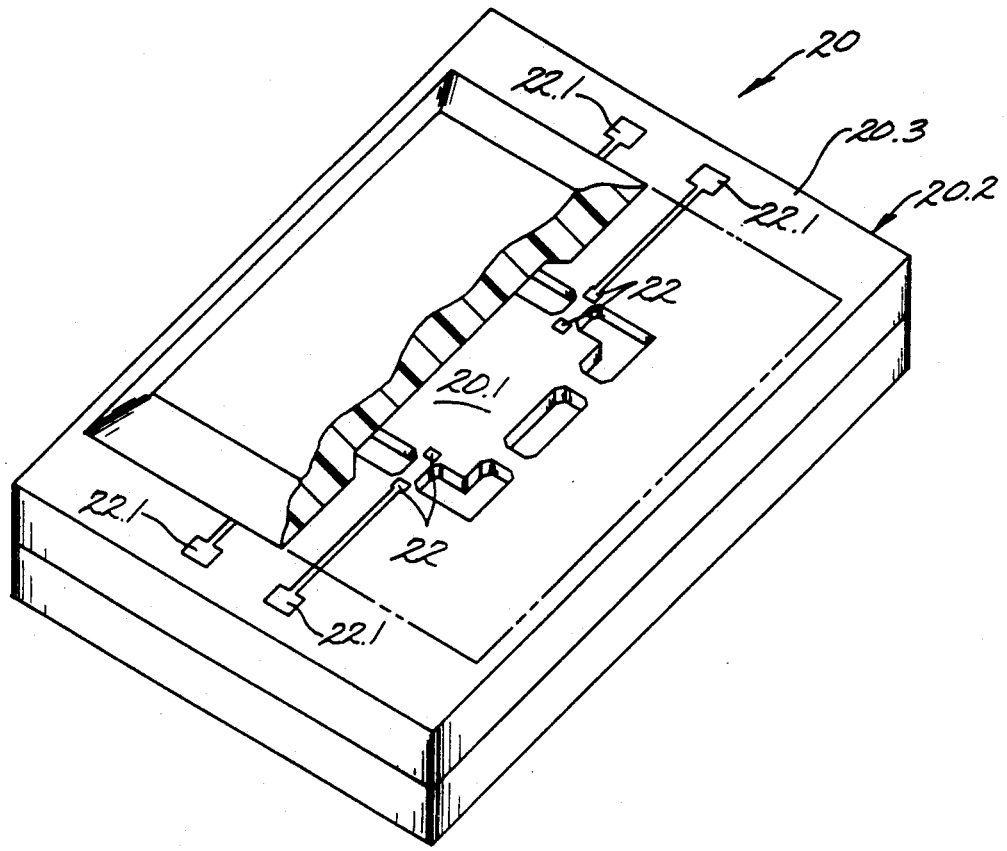
FIG. 6 is a perspective view to greatly enlarged scale of an accelerometer unit used in the device of FIG. 1.

The acceleration device 10 also includes a silicon accelerometer unit 20 of generally conventional type. As shown particularly in FIG. 6, the accelerometer unit comprises a silicon mass 20.1 which is movable in a silicon body 20.2 relative to an integral silicon support 20.3 to provide strain in the silicon body in response to acceleration of the body, and piezoresistive sensor means 22 are formed in the silicon body to be responsive to that strain to provide an electrical signal corresponding to the acceleration. The piezoresistive means are connected to unit terminal pads 22.1 as will be understood. As such acceleration units are known as shown in commonly assigned, copending applications for U.S. Pat. Ser. No. 07/631,563 filed Dec. 12, 1990 and Ser. No. 07/718,523, now issued into U.S. Pat. No. 5,121,180, filed Jun. 21, 1991, the disclosure of which are incorporated herein by this reference, the accelerometer unit is not further described herein and it will be understood that the unit is adapted to be mounted on an object such as an automotive vehicle 24 (see FIG. 1) whose acceleration is to be monitored and the piezoresistive sensor means 22 are adapted to be connected in a control circuit or the like to perform a control function in response to the occurence of selected acceleration (or deceleration) of the object. For example, the accelerometer unit is adapted to provide an electrical output signal corresponding to vehicle acceleration to regulate operation of an automotive safety air bag system on occurrence of a vehicle accident.

Figure 2:
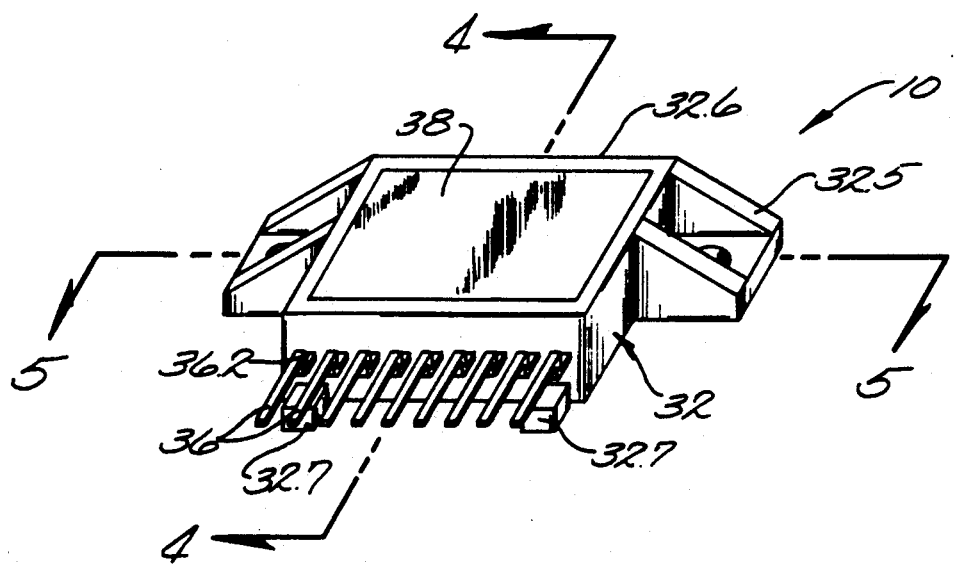
FIG. 2 is a perspective view of the device of FIG. 1.
Figure 3:
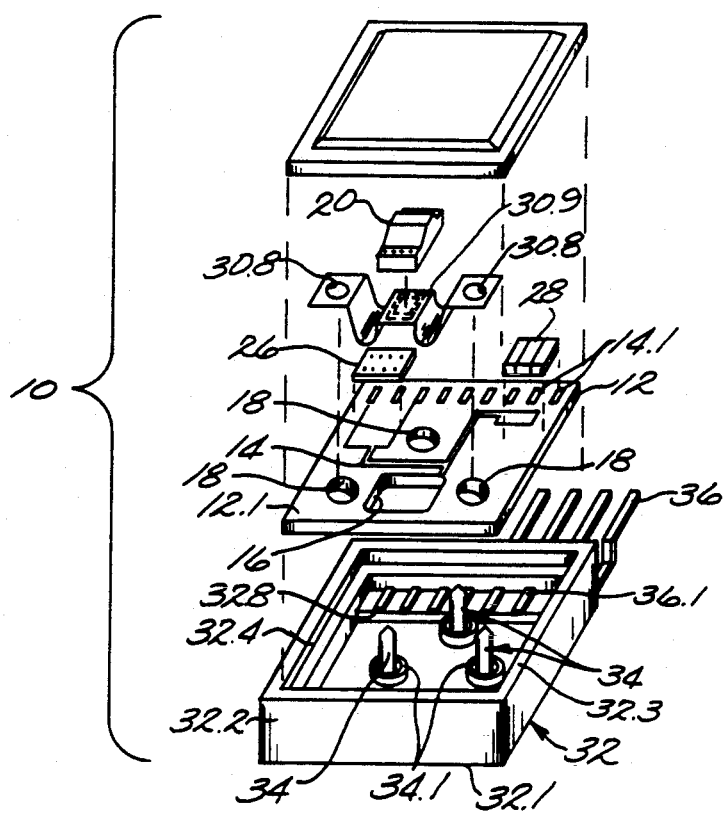
FIG. 3 is an exploded view of the device of FIG. 1 illustrating assembly of the device, reoriented relative to FIG. 2 for clarity of illustration.
Figure 4:
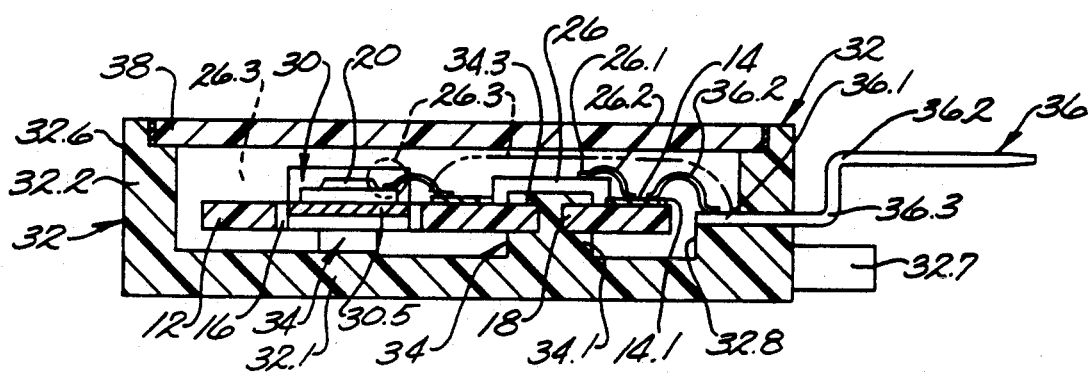
FIGS. 4-5 are section views to enlarged scale along lines 4—4 and 5—5 of FIG. 2.
Figure 5:
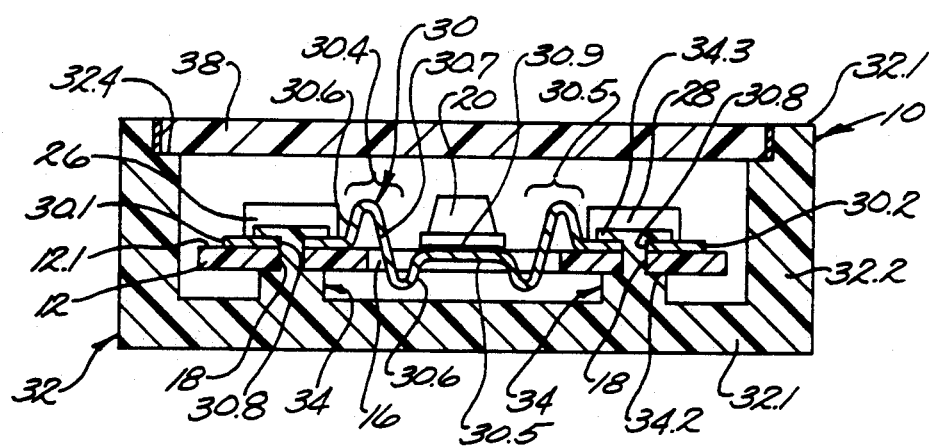

The accelerometer device 10 also includes circuit components such as a control circuit 26 embodied in an integrated circuit chip or the like as well as resistors and/or capacitors and the like diagrammatically indicated at 28 in FIGS. 2-4 which are mounted on the substrate 12 and electrically connected to the circuit paths 14 to form a circuit for conditioning the electrical output signal provided by the accelerometer unit 20 in conventional manner. Preferably the noted circuit components are attached and connected on the substrate using conventional surface-mount and chip-on-board technologies. Preferably for example, the i.c. chip 26 is bonded to the substrate by die-attach adhesives and terminals 26.1 of the chip etc. are connected to circuit paths by small diameter aluminum wires 26.2 wire bonded to the terminals 26.1 and to the circuit paths 14. Preferably the resistors and capacitors are soldered directly to the circuit paths and substrates. Preferably the components and wire bond locations are provided with a conformal coating diagrammatically indicated at 26.3 to chemically and mechanically protect the components and bonds.

A member 30 is also provided in the device for suspending or mounting the accelerometer unit 20 on the substrate 12 to permit the unit to respond to acceleration forces while the piezoresistive sensor means of the unit are connected in the signal conditioning circuit while also protecting the sensor means from strain in the silicon body 20.2 which might be due to clamping forces during device mounting in the automotive vehicle or to differences in thermal expansion properties of the silicon body, the materials of the substrate 12, and the materials of the circuit paths 14. Preferably the member has portions 30.1, 30.2 secured to the substrate and another portion 30.3 for receiving the accelerometer unit thereon. In a preferred embodiment of the invention, the member is formed of a metal material such as a nickel-iron alloy having a nominal composition by weight of 36-50% nickel and the balance iron and having coefficient of thermal expansion which substantially corresponds to that of silicon used in the accelerometer 20. Preferably for example, the member is formed of a nickel-iron alloy comprising from 38.3 to 39.5% nickel, 0.35 to 05.% manganese, 0.25% max. silicon, 0.12% max. carbon, and 0.25 max. each of sulfur and phosphorous, and the balance iron the material being sold under the designation Low E39 by Carpenter Technology Corporation and having a coefficient of thermal expansion of 2.2 ppm/°C.. Preferably the member has opposite member ends 30.1, 30.2 secured to the substrate 12 at opposite sides of the substrate opening 16, has a central platform portion 30.3 disposed within the substrate opening, and has folded-leaf spring portions 30.4, 30.5 (preferably with two half-leafs 30.6 folded back on opposite sides of a full central leaf 30.7) extending between the platform 30.3 and the opposite member ends 30.1, 30.2 to suspend the platform in the substrate opening. In that configuration of the member, the folded leaf-spring portions serve as flexure-reducing means to reduce movement of the member platform when stresses due to relative thermal expansion of the substrate are transmitted to the member from the substrate. In a preferred embodiment of the invention, the member has a mounting aperture 30.8 in each of the opposite member ends and a top surface 30.9 of the platform is arranged to be parallel and just below the top surface level of the substrate surface 12.1. Preferably small diameter aluminum wires 22.2 are wire-bonded to the accelerometer unit terminals 22.1 and to the circuit path means 14.

The accelerometer device 10 also preferably includes a cup-shaped housing 32 having a bottom 32.1, a side wall 32.2 and a rim 32.3, the rim having a shoulder 32.4 formed therein around the open end of the cup. The housing is preferably formed of a strong rigid material such as glass-filled nylon or the like and preferably has a pair of mounting lugs 32.5 spaced at opposite sides of the housing adjacent one end 32.6 of the housing while integral, flexible bumper feet 32.7 or the like are provided on an exterior surface of the housing adjacent the opposite housing end. Three integral pins 34 are also provided in the housing in upstanding relation to the housing bottom inside the housing and preferably each pin has a portion 34.1 of relatively larger diameter forming a shoulder 34.2 on the pin spaced from the housing bottom. Preferably each pin has small barbs running around its circumference. Preferably device terminals 36 are provided in the housing to extend out from the housing. Preferably the terminals 36 are insert-molded within the housing to extend in sealed relation through the housing side wall and preferably a cover 38 is provided to be secured in sealed relation to the housing shoulder 32.4 by adhesive means or the like for sealing the device housing. Preferably each of the terminals has an inner end 36.1 exposed within the housing and supported on a step 32.8 provided in the housing and aluminum wires 36.2 are wire bonded to the respective terminals ends 36.1 and to corresponding circuit path pads 14.1 to minimize thermal coefficient of expansion mismatch in these connections. Preferably each terminal has two right angle bend portions 36.2, 36.3 permitting compliant connection of the terminal member in the vehicle circuit free of strain applied to the silicon accelerometer body due to connection of the terminal in the vehicle circuit therein as shown.

With that structure, the accelerometer device 10 is easily and accurately assembled to provide improved performance when used in an automotive environment. That is, the circuit components 26 and 28 are mounted and connected on the substrate and the mounting apertures 18 of the substrate are fitted over the integral housing pins 34 to rest the substrate on the pin shoulders 34.2. The pin barbs provide a force fit within the mounting apertures to provide centering or precise positioning of the substrate in the housing. The accelerometer unit mounting member 30 with its accelerometer unit 20 secured to the platform portion of the member by adhesive or the like has its mounting apertures 30.8 fitted over two of the housing pins to dispose the platform portion of the member within the opening 16 in the substrate. The distal ends of the pins are then flattened by ultrasonic staking or the like to form the pin heads 34.3 against the member 30 or the substrate 12 for securing the member to the substrate and for securing the member and substrate in securely fixed position in the housing. The terminal pads 22.1 of the accelerometer unit are thereby disposed in closely spaced relation to the circuit paths 14 and are connected to the circuit paths with wire bonds as described above either before or after assembly of the member and substrate within the housing as preferred. The substrate terminal pads are connected to the terminal ends 36.1 by wire bonds after the substrate is positioned within the housing. The cover 38 is then sealed over the open housing end with an adhesive for sealing the device.

The resulting accelerometer device has a rugged and durable construction. When the device is mounted on an automotive vehicle 24, bolting of the two mounting lugs or basses is preferably arranged as shown so that the flexible housing bumper is wedged against a portion of the vehicle to secure the device firmly to the vehicle without exerting excessive clamping stresses on the device 10. Within the device, the silicon mass 20.1 of the accelerometer unit is positioned to be highly responsive to acceleration forces in the direction indicated by the arrow 40 in FIG. 1. The substrate 12 and the member 30 cooperate to provide securely fixed and solid support for the accelerometer unit 20 during exposure of the device to acceleration forces. The aluminum wires wire-bonded to the various circuit paths, pads and terminals in the device are oriented to avoid excessive stress during device acceleration. Further, when the device is exposed to wide swings in temperature in an automotive environment, the configuration and thermal expansion properties of the member 30 cooperate to effectively isolate and shield the piezoresistive sensor means in the accelerometer unit from strain in the silicon accelerometer unit body which might be due to differential thermal expansions of the body, the substrate 12, and the circuit path means 14. That is, the very low thermal expansion characteristics of the member 30 limit strain in the silicon body due to differential thermal expansion of the silicon body and the member. Further, any stress which is applied to the member as a result of differential thermal expansion between the substrate and circuit paths and the member is substantially absorbed in the folded-back leaf spring or flexure-reducing portions 30.4, 30.5 of the member so that movement of the platform 30.3 of the member during such temperature changes is substantially reduced. In that way, the accelerometer device is adapted to provide an output signal more precisely corresponding to the acceleration forces applied to the device.

It should be understood that although particular embodiments of the accelerometer device of the invention have been described by way of illustrating the invention, the invention includes all modifications and equivalents of the disclosed embodiments falling within the scope of the appended claims.

We claim:

1. An accelerometer device comprising an electrically insulating substrate having electrically conductive circuit paths thereon and having an opening in the substrate, an accelerometer having a silicon mass movable in a silicon body relative to an integral silicon support to provide strain in the silicon body in response to acceleration and having piezoresistive sensor in the body responsive to the strain to provide an electrical signal corresponding to the acceleration, means electrically connecting the piezoresistive sensor to the circuit paths, circuit component means mounted on the substrate electrically connected to the circuit paths for conditioning the electrical signal, and a member having opposite ends secured to the substrate, having a platform intermediate the ends, and having folded-leaf spring portions extending between the platform and the respective ends of the member disposing the platform in the substrate opening, the member being formed of material having a selected coefficient of thermal expansion substantially corresponding to that of silicon to cooperate with the configuration of the folded-leaf spring portions of the member for minimizing the effects of strain to piezoresistive sensor from the silicon body due to differences in thermal expansion of the silicon body and the substrate during temperature changes likely to be encountered.

2. An accelerometer device according to claim 1 wherein the circuit paths are disposed on a planar surface of the substrate, and the folded-leaf spring parts of the member dispose an upper surface of the platform to be parallel to, adjacent and lower than the planar substrae surface for compactly accommodating the accelerometer and member in the device.

3. An accelerometer device according to claim 2 further comprising a cup-shaped housing having a bottom and a side wall, having a cover secured to the side wall, and having three integral pins upstanding from the bottom within the housing, each pin having an integral shoulder thereon at a selected level above the bottom of the housing, the substrate having three apertures therein fitted over the respective pins positioning the substrate against the shoulders, and the pins having head portions formed over the substrate securing the substrate in position within the housing.

4. An accelerometer device according to claim 3 wherein the member mounting the accelerometer is formed of a nickel-iron alloy having a nominal composition by weight from 38.3 to 39.5% nickel, 0.35 to 0.5% manganese, 0.25% max. silicon, 0.12% max. carbon, and 0.025 max. each of sulfur and phosphorous, and the balance iron.

5. An accelerometer device according to claim 3 wherein the opposite ends of the member mounting the accelerometer have respective mounting apertures therein, the member mounting apertures being fitted over respective housing pins and having the head portions thereof formed over the member ends for securing the member ends to the substrate.

6. An accelerometer device according to claim 3 wherein the housing has mounting means adjacent one end of the housing for securing the device on a vehicle whose acceleration is to be monitored and has a flexible locating bumper adjacent an opposite end of the housing to bear against the vehicle to precisely position the housing relative to the vehicle, the device having at least one terminal connected to the circuit paths extending through the housing side wall to be connected in a vehicle circuit, the at least one terminal having two right angle bends therein permitting compliant connectin of the at least one terminal in the vehicle circuit free of strain applied to the silicon accelerometer body due to connection of the at least one terminal in the vehicle circuit.

7. An accelerometer device according to claim 1 further comprising a housing having at least one terminal in said housing for connecting to the circuit paths by wire bonding to minimize thermal coefficient of expansion mismatch in the connection.

* * * * *